(12) United States Patent
DeCusatis et al.

(10) Patent No.: US 6,438,285 B1
(45) Date of Patent: Aug. 20, 2002

(54) FACILITY FOR INTIALIZING A FIBER OPTIC DATA LINK IN ONE MODE OF A PLURALITY OF MODES

(75) Inventors: Casimer M. DeCusatis, Poughkeepsie; Thomas A. Gregg, Highland; Daniel J. Stigliani, Jr., Hopewell Junction, all of NY (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 09/583,510

(22) Filed: May 31, 2000

(51) Int. Cl.[7] .............................. G02B 6/28; H04L 12/42

(52) U.S. Cl. .................... 385/24; 370/453; 370/457; 710/10; 710/11

(58) Field of Search ........................ 385/24, 37, 14; 370/245, 250, 282, 285, 287, 291, 453, 457; 359/124, 125, 128; 710/10, 11, 14

(56) References Cited

U.S. PATENT DOCUMENTS 5,668,810 A * 9/1997 Cannella, Jr. ............... 370/392
6,081,847 A * 6/2000 Lin ............................ 709/250
6,145,024 A * 11/2000 Maezawa et al. ............. 385/24

* cited by examiner

*Primary Examiner*—Hemang Sanghavi
(74) *Attorney, Agent, or Firm*—Lily Neff, Esq.; Floyd A. Gonzalez, Esq.; Heslin Rothenberg Farley & Mesiti P.C.

(57) ABSTRACT

An initialization facility is provided for a fiber optic data link wherein the link can be initialized in one of a plurality of fiber control modes, including one or more open fiber control (OFC) modes and a non-OFC mode. Initialization may be automatic, being responsive to received optical signals, or user determined. Along with the initialization facility, safety logic is presented which allows the facility to be fully compliant with industry standard laser safety requirements for inherently safe Class 1 operation. Further, logic is provided for controlling resetting of an OFC chip. In one embodiment, the facility can be implemented in an auto-sense circuit coupled between a conventional OFC chip and a transceiver of the fiber optic data link.

52 Claims, 5 Drawing Sheets

FACILITY FOR INTIALIZING A FIBER OPTIC DATA LINK IN ONE MODE OF A PLURALITY OF MODES

TECHNICAL FIELD

The present invention relates in general to fiber optic data communications, and more particularly, to a facility for automatically initializing a fiber optic communications link in one of a plurality of fiber control modes. The facility allows different types of open fiber control (OFC) channels to automatically communicate, as well as allowing an OFC capable channel to automatically communicate with a non-OFC channel.

BACKGROUND OF THE INVENTION

Fiber optic communication links are an integral part of many computer systems. Certain of these data links employ a handshaking protocol known as "Open Fiber Control" (OFC). This protocol was originally developed and standardized by the ANSI X3T9 technical committee for laser safety purposes, since it allows the use of higher optical power levels (and corresponding longer distances) in a fiber optic link without violating international Class 1 laser safety standards if the link is broken or disconnected for any reason.

When a pair of transceivers with OFC are connected by a duplex fiber optic cable, the hardware performs a handshake to establish that both ends of the link are connected and observing the OFC protocol before lasers are turned on at full power for data transmission. The handshaking protocol begins with the lasers pulsed at a low power level for a long inactive period (typically 10 seconds) until the link is reconnected. At this point, each transceiver detects a pulse from the other end of the link with the proper duration and timing, which initiates the handshake; the lasers turn on to full power again only when the handshake completes successfully. If the link is opened for any reason (such as a broken fiber or pulled connector) then both ends of the link detect this event and automatically shut off their lasers fast enough to prevent any unsafe light exposure. Further details of OFC can be found in the ANSI Fiber Channel Physical and Signaling Interface (SC-PH), dpANS X3.230-199X.

Many types of systems employ OFC links for fiber channel data transmission. Although OFC links were the only method previously available to maintain laser safety while extending the distance of data links, their implementation has posed certain problems. These problems include requiring additional complexity in both hardware and system code to reset the OFC function as required, and both performance and service impacts in waiting the 10 second delay before the link becomes operational. Further, during maintenance and service the optical power and receiver sensitivity of an OFC link cannot be measured directly, since opening the link to attach a power meter would deactivate the lasers. Additional service tools such as an optical power splitter are thus required. The 10 second wait time is incurred each time the channel is taken off line or optical cables are changed, which may impact system availability and performance. Also, it is difficult to propagate OFC through an optical repeater, channel extender, or multiplexor without causing data link problems, which has made the implementation of these functions significantly more difficult when OFC is employed.

More recently, changes in laser safety standards have allowed higher optical powers, and thereby longer distance optical transmissions without requiring OFC. For the reasons stated above, it has therefore been desirable to remove OFC from future generations of coupling links in many systems. However, new systems must still inter-operate with a large number of OFC legacy systems in the field. The only alternative in use today is to support two different cards for each application, one for OFC and one for non-OFC links. This creates obvious problems of added cost and inventory tracking.

In view of the above, there exists a need in the art for an apparatus and method which can switch between OFC and non-OFC modes of operation as required by a particular application without compromising Class 1 laser safety.

DISCLOSURE OF THE INVENTION

Briefly summarized, the invention comprises in one aspect a method for automatically initializing a fiber optic data link in one of a plurality of fiber control modes. The method includes: automatically bringing up the fiber optic data link in one mode of a plurality of fiber control modes; determining whether the fiber optic data link initializes in the one mode; and automatically disabling the one mode if the fiber optic data link does not initialize and determining thereafter whether the fiber optic data link initializes in another mode of the plurality of fiber control modes.

In another aspect, a method for initializing a fiber optic data link in one of a plurality of modes is provided which includes: providing a plurality of fiber control modes within which the fiber optic data link can be initialized, wherein the plurality of fiber control modes includes at least one open fiber control (OFC) mode; selecting one mode of the plurality of fiber control modes in which to bring up and initialize the fiber optic data link; and providing hardware safety logic associated with the fiber optic data link to ensure disabling of the fiber optic data link if the data link is initialized in an OFC mode and the OFC mode is subsequently disabled.

System and program storage devices corresponding to the above-noted methods are also described and claimed herein.

To restate, provided herein is a technique for implementing a single system design which can function in either open fiber control (OFC) or non-OFC fiber optic links on demand. The technique includes providing auto-sense logic which senses whether a link is OFC or non-OFC and responds accordingly. Thus, no OFC software is required on new machine designs to keep the machines compatible with legacy OFC products. The auto-sense capability of the present invention is fully compliant with industry standard laser safety regulations for inherently safe Class 1 operation. Class 1 laser safety is ensured by turning off the transmitter when switching between OFC and non-OFC modes of operation.

Advantageously, the auto-sense capability of the present invention can be used to implement OFC using any type of standard optical transceiver with a laser disable function, including different voltage levels and small form factor optics which have no room for incorporating integrated OFC chips into their packaging. This also provides a cost savings compared with purchasing only 5-volt parts with integrated OFC logic in a larger package. Further, the present invention solves a problem with ambiguity in the OFC reset function present in many commercial OFC chips. Options include the ability to perform optical wrap with and without OFC, and to use signal detect from either the optics or the serialized/deserialized function. Further, the invention includes a redundant laser shutdown feature to ensure Class 1 laser safety under all operational mode changes from the host system. In particular, the invention includes a fail-safe mechanism to ensure that code bugs do not cause a laser safety problem.

Switching between OFC and non-OFC modes can be manually accomplished during configuration of a channel, or alternatively, logic can automatically sense whether the system is attached to an OFC or non-OFC channel and enable/disable OFC functions accordingly. This allows future products to inter-operate with legacy systems while taking advantage of performance improvements when the system is attached to non-OFC systems. It also removes the requirement to implement OFC control functions in the system code of new machines. The technique of the present invention can be readily incorporated into the design of optical repeaters and channel extenders. Also, as noted, secondary benefits include the ability to auto-sense different types of OFC signaling so that one channel could inter-operate with many different kinds of industry standard OFC-enabled equipment.

Additional features and advantages are realized through the techniques of the present invention. Other embodiments and aspects of the invention are described in detail herein and are considered part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, described herein is a facility for initializing a fiber optic data link in one of a plurality of fiber control modes, including multiple open fiber control (OFC) modes and/or a non-OFC mode. Along with this initialization capability, which may be automatic or manual, safety logic is presented which allows the facility presented to be fully compliant with industry standard laser safety regulations for inherently safe Class 1 operation. This safety logic comprises a redundant laser shutdown feature to ensure Class 1 laser safety under all operational mode changes from a host system. Further, the present invention solves an existing problem with ambiguity in the OFC reset function present in many commercial OFC chip designs. Each of the above-noted features of the present invention is described in detail below with reference to FIGS. 1–5 of the application.

The basic functions required to implement OFC pulses with correct timing are described in the above-referenced ANSI standard, and are available in many industry standard chip sets, including, for example, those used in the optical link modules (OLM) available from International Business Machines Corporation. Described below is a technique by which these chips can be interfaced with standard fiber optic transceivers so that an OFC function can be enabled or disabled either manually or automatically as needed.

Figure 1:
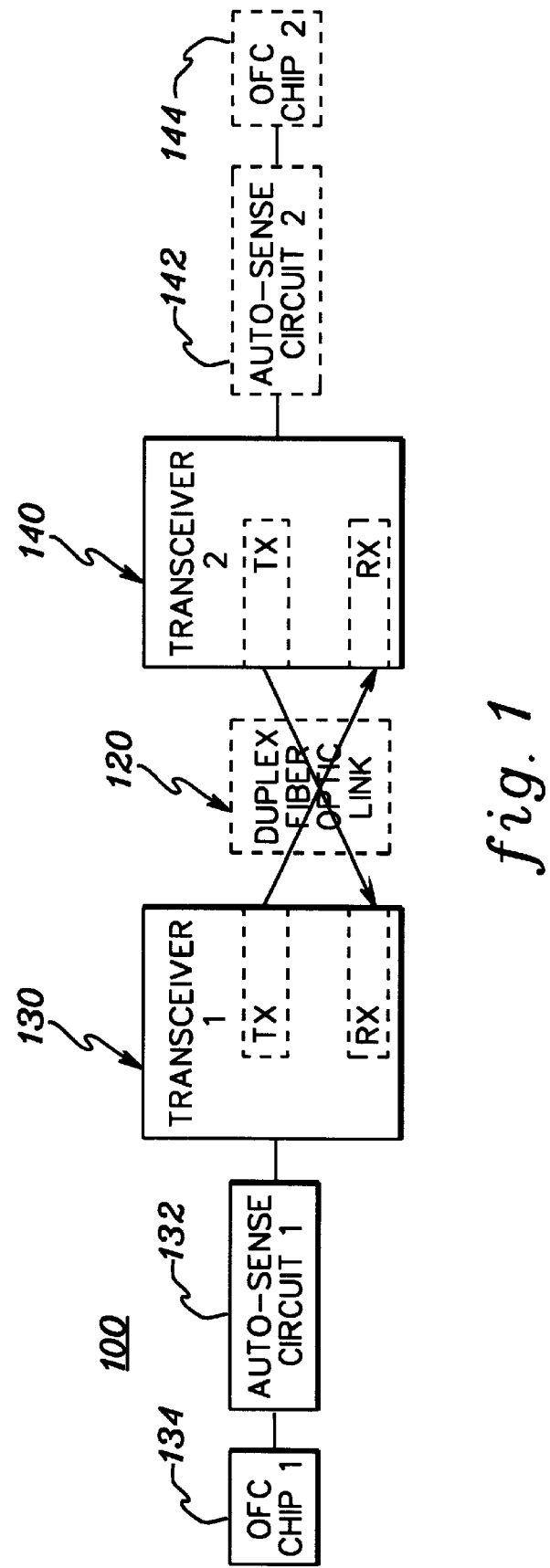
FIG. 1 depicts one embodiment of a fiber optic data link employing a mode auto-sense facility in accordance with the principles of the present invention.

FIG. 1 depicts one embodiment of a fiber optic data link, generally denoted 100, employing an auto-sense capability in accordance with the principles of the present invention. The link circuitry includes a duplex fiber optic link 120 having a transceiver at each end, transceiver 1 130 and transceiver 2 140. Each transceiver 130, 140 has a transmit circuit and a receive circuit which together allow optical signals to be propagated between the transceivers across duplex fiber optic link 120.

In one embodiment, an auto-sense circuit 1 132 is provided between transceiver 1 130 and, e.g., an off-the-shelf open fiber control (OFC) chip 134. Any industry standard OFC chip may be employed with this circuitry, as well as any standard transceiver. As an alternative embodiment, the auto-sense circuit 132 could be fabricated as part of a custom OFC chip or as part of a custom transceiver. In the embodiment of FIG. 1, transceiver 2 140 is shown with a second auto-sense circuit 142 and a second OFC chip 144. These circuits are shown in phantom since the circuits may or may not be present depending upon whether transceiver 2 is configured for optional OFC data transmission employing an auto-sense circuit in accordance with the principles of the present invention.

Operationally, a bi-directional serial optical data stream passes across the duplex fiber optic link and comprises the input/output of, for example, duplex optical transceiver 130. The transceiver converts the optical data to electrical data and passes it to a serialize/deserialize (serdes) chip (not shown), which in turn provides parallel data plus clock to a coupling link such as an InterSystem Channel (ISC) Parallel Sysplex coupling link marketed by International Business Machines Corporation. The serdes chip takes its clock from an on-card oscillator, and this common clock is typically divided by four before it is provided to the OFC chip.

Figure 2:
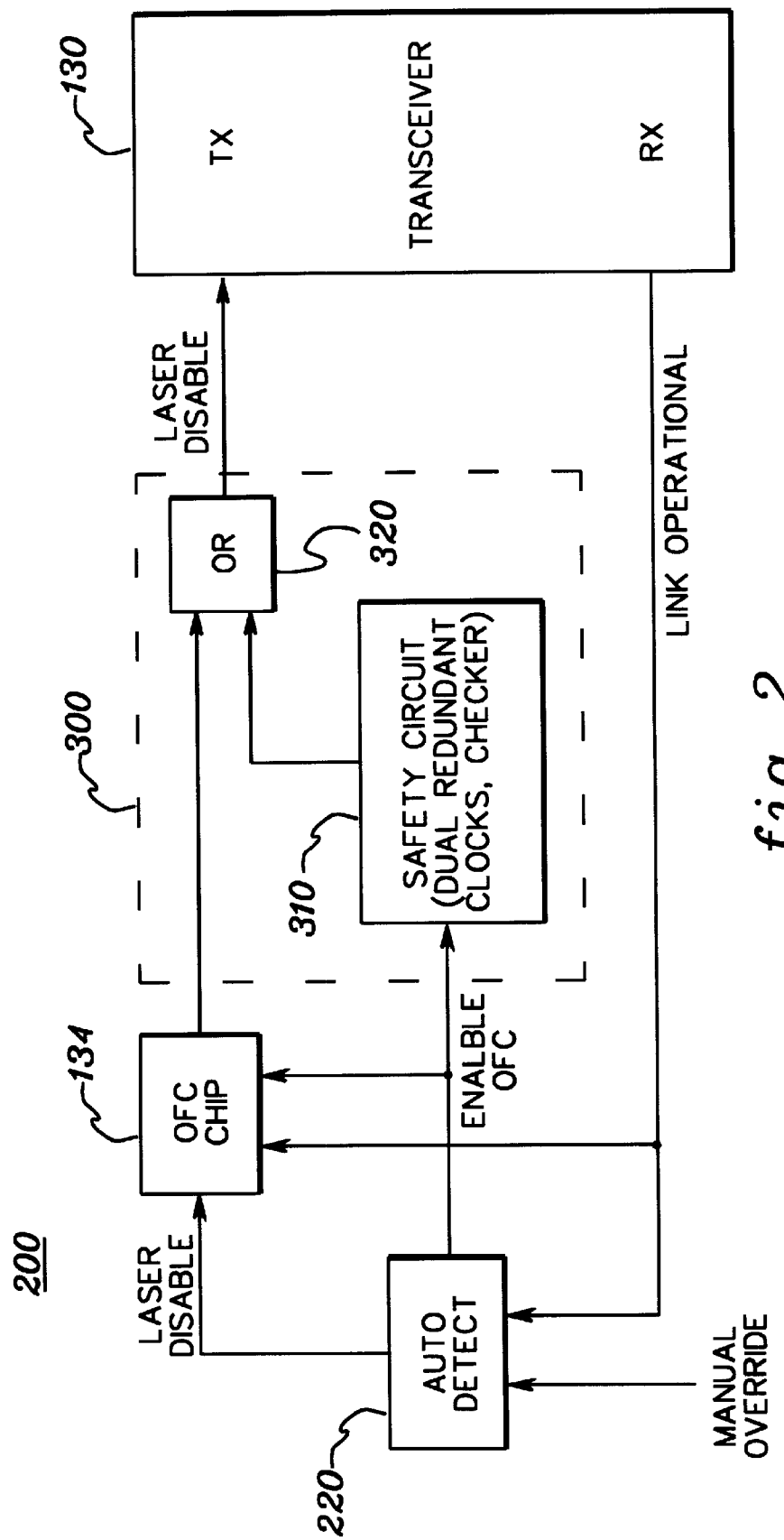
FIG. 2 is a block diagram showing in greater detail one embodiment of mode auto-sensing in accordance with the principles of the present invention.
Figure 3:
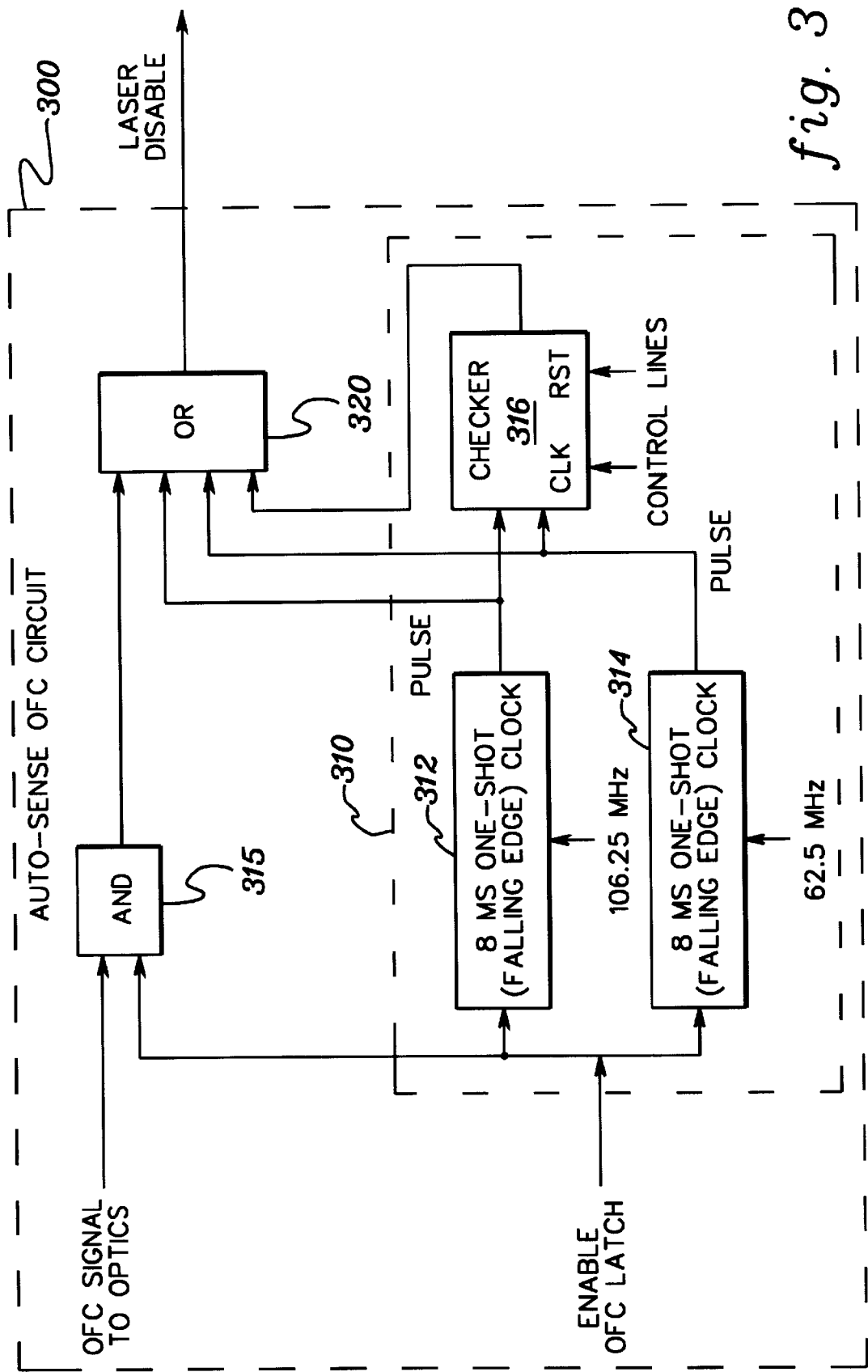
FIG. 3 is a partial block diagram of FIG. 2 showing one embodiment of a safety circuit for the mode auto-sense facility of the present invention.

FIGS. 2 & 3 depict in detail one embodiment of an auto-sensor circuit in accordance with the present invention. This circuit, which may be part of an ASIC, is provided in one embodiment independent of an off-the-shelf OFC chip and off-the-shelf transceiver such as depicted in FIG. 1. The circuit, denoted 200, in FIG. 2 includes OFC chip 134 which receives a laser disable signal from an auto detect logic 220 implemented in accordance with the principles of the present invention. Auto detect logic 220 has as inputs a manual override, to manually disable the OFC chip (i.e., to manually select the fiber control mode to be employed), and a link operational signal received through the receive logic of transceiver 130. Auto detect logic 220 also provides as output an enable OFC signal which is fed to OFC chip 134 and to an input of a safety circuit 310 implemented in accordance with the present invention. The laser disable/enable signal is output from OFC chip 134 through an OR gate 320 to the transmitter of transceiver 130. As discussed below, the OR circuit determines whether the OFC chip can communicate with the transceiver (i.e., enable or disable OFC function). Safety circuit 310 includes dual redundant clocks and a checker, one embodiment of which is depicted in FIG. 3.

As shown, safety circuit 310 includes a pair of 8 ms 1-shot devices 312, 314 and a logic checker 316. The function of safety circuit 310 is to ensure that no single point of failure in the system will cause the laser to turn on at unsafe levels. When the safety circuit receives a signal to disable the OFC (either from the auto detect logic of FIG. 2 or manually by a user) it fires the 1-shot devices 312, 314. Devices 312, 314 in turn generate an output pulsed signal. If either or both of the 1-shots fires, it will momentarily disable the laser, thereby causing a reinitialization of the link. If one path fails, as detected by checker 316, then the laser is not enabled. The 1-shot devices 312, 314 are driven off dual clocks at different frequencies so that a clock failure does not take down both devices and cause a single point of failure. In one example, the different frequencies may comprise 62.5 MHz and 106.25 MHz. The pulsed signals from the 1-shots 312, 314 are processed by checker logic 316 to ensure that the 1-shot devices are operational and that the safety circuit does not turn on the laser accidentally. The checker logic may have other inputs such as control lines including a clock line and a reset line.

To restate, in a basic implementation, the auto-sense circuit of the present invention controls whether or not an OFC chip is active. In a manual override implementation, a user could define the channel type as either OFC or non-OFC during system configuration or power-on reset. When the OFC chip is enabled, it monitors the signal detect line from the transceiver and generates OFC pulses with the correct duration and timing for transmission across the fiber optic link. If the optical transceiver has a built-in transmitter disable function, the OFC chip drives this directly. If not, the optics could be driven through a power field effect transistor (FET) on the laser power input. When the auto-sense circuit disables the OFC chip, the transmitter is turned on continuously and data transmission is accomplished in the conventional manner for non-OFC links.

As noted, one feature of auto-sense circuitry pursuant to this invention is the ability to selectively disable OFC without violating laser safety standards. The transceivers employed are selected to provide Class 1 operation under continuous optical power (i.e., under the most recent industry standards). Therefore, there is no safety issue when driving this module in either OFC or non-OFC modes. Transceivers on the other end of the link may use lasers which do not comply with Class 1 power levels, i.e., unless they are implemented with the OFC function. In order to ensure that the auto-sense circuitry of the present invention satisfies this condition, an industry standard OFC chip can be employed with safety features implemented, such as redundant control lines for the OFC function and proper control of the OFC chip reset functions (see FIG. 5). With these features, the auto-sense capability of the present invention ensures that no single fault will cause exposure to unsafe laser emission levels from attached equipment.

In one embodiment, the auto-sense circuitry may bring up the link in OFC mode for safety reasons. Upon bringing up the link in OFC mode, the circuit would evaluate the output of the optical transceiver to determine whether a compatible OFC pattern is being received. Those skilled in the art will note that by adding additional logic it is possible to detect various types of OFC signaling. For example, OFC signals corresponding to the ANSI standard for either 266 Mbit/s or 1.0625 Gbit/s transmission could be detected. If such a signal is received, then the OFC responds with the proper handshake and initializes the link. Should the link be subsequently disconnected and reattached to a non-OFC link, the system will detect this by observing that the output of the optical receiver is a continuous signal and that the OFC signaling does not exist.

Once disconnected, an OFC link cannot transmit continuous signals without handshaking first, so upon receiving such a continuous signal, the auto detect circuitry assumes that it is attached to a non-OFC device, disables the OFC chip, and reverts to non-OFC mode. If the auto-sense circuitry is disconnected for an extended time, then it alternates between OFC and non-OFC mode every 30 to 60 seconds searching for an attached link. This guarantees that the link will always re-establish once it is reconnected.

As a further enhancement, the OFC pulse interval can be altered in the present system so that rather than pulsing every 10 seconds, an OFC pulse can be sent much more frequently, for example, every 100 milliseconds. This does not violate laser safety on the link since the present transmitter complies with Class 1 laser safety (without OFC) is inherently safe already and the other end of the link does not care when the initial OFC pulse is launched. This allows the system of the present invention to initialize with and OFC link much faster than a conventional OFC transceiver. Also, note that in one embodiment the present system requires only changes to an ASIC and otherwise uses standard components. This is less expensive than purchasing an optical transceiver with OFC integrated into the package and will result in an overall cost savings for the channel. Furthermore, an auto-sense system in accordance with the present invention works with any type of standard optical transceiver with a laser disable function and loss of signal, including both 5 V and 3.3 V devices as well as the new small form factor (SFF) optics which are being standardized in the industry. These optics are not currently offered with integral OFC functions, therefore the auto-sense capability of the present invention could advantageously make SFF optics inter-operate with an OFC link without requiring customized transceiver designs.

As noted, the design of the auto-sensing circuitry is fail-safe to ensure that Class 1 laser safety limits are not compromised. The present invention, in addition to providing signal redundancy, also has the ability to disable the transmitter for a minimum time period (e.g., 4 ms) whenever a switch of operations occurs from OFC to non-OFC mode. This function can be contained redundantly in the logic. As noted, FIG. 3 depicts in greater detail one embodiment of the safety circuit for an auto-sense OFC circuit 132 in accordance with the present invention.

Figure 4:
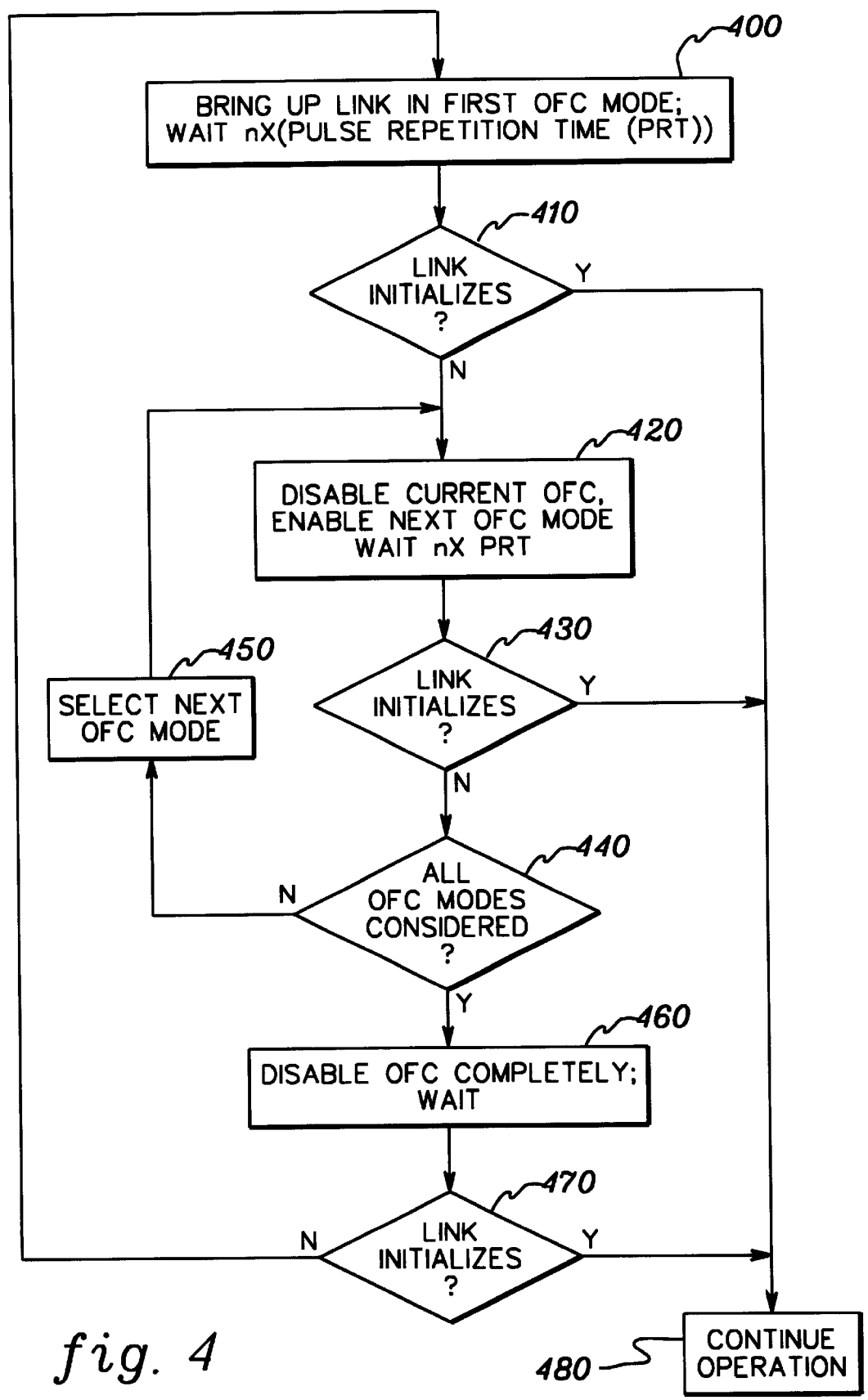
FIG. 4 is a flowchart of one embodiment for automatically initializing a fiber optic data link in one mode of a plurality of modes in accordance with the principles of the present invention.

FIG. 4 is a flowchart of one embodiment of the logic implemented by auto detect processing 220 of FIG. 2. This example assumes that the system supports multiple fiber channel modes including at least two OFC modes and a non-OFC mode. Those skilled in art will note that this logic could be implemented as a micro controller or as a set of logic gates in hardware, or in some other way. The logic allows the auto-sense circuit to automatically step through various OFC and non-OFC options, trying each one in turn until the circuit gets the link to initialize. Note again, the safety circuit described herein acts to isolate the auto detect logic from the laser disable signal so that laser safety certification is achieved, i.e., because the safety circuit is a hardware only implementation.

When in auto-sense mode, the system of the present invention brings up the link in a first OFC mode and waits a defined interval, such as n×(pulse repetition time(PRT)) 400, wherein n>1. Processing then determines whether the link initializes 410, and if so, continues normal operations 480. If the link does not initialize, then the current OFC mode is disabled and a next OFC mode is enabled, after which processing waits n×PRT 420 before determining whether the link initializes 430. If so, normal data communications is continued 480. Assuming that the link does not initialize in the current OFC mode, processing determines whether all OFC modes have been considered 440. If not, a next OFC mode is selected 450 and the current OFC mode is disabled, the next OFC mode is enabled and processing waits n×PRT before determining whether the link initializes. Once all OFC modes have been considered, which in one alternate embodiment may only comprise one OFC mode, processing disables the OFC chip completely and waits a predetermined length of time 460 before determining whether the link initializes in non-OFC mode 470. If so, then normal data communications is continued 480. Otherwise, processing loops back to again bring up the link in the first OFC mode 400. The process repeats until the link is initialized in one of the OFC modes or the non-OFC mode.

Many alternate embodiments of the present invention are possible. For example, the signal detect function could be provided by a serdes chip rather than by the optics. Loop back enable (for wrap testing and diagnostics) may be activated either with or without the OFC function in the loop. This design also addresses certain problems with existing OFC implementations. Although the host logic does not have to reset the OFC chip if the transmitter is disabled by the OFC function, a reset function is required when the internal checking logic in the OFC chip detects an error. Since the host logic only knows that the laser is disabled, but has no way of knowing whether this was due to normal OFC function or to an internal checking error, the host cannot know when to reset the OFC chip. Host logic to reset the OFC chip must be relatively simple and function correctly in case of all transient errors on the chip.

Therefore, in accordance with one aspect of the present invention, an ASIC for the data link can be modified to include a timer which is activated when the transceiver is disabled by the OFC chip. The timer is relatively long compared with an OFC pulse interval, for example, 30–60 seconds for a 10 second OFC interval. If the transceiver is not re-enabled before this timer expires, the ASIC attempts to automatically reset the OFC chip. This process continues indefinitely until the link is re-established. The large interval is selected to ensure that a conventional OFC link will always re-establish before the timer expires.

Figure 5:
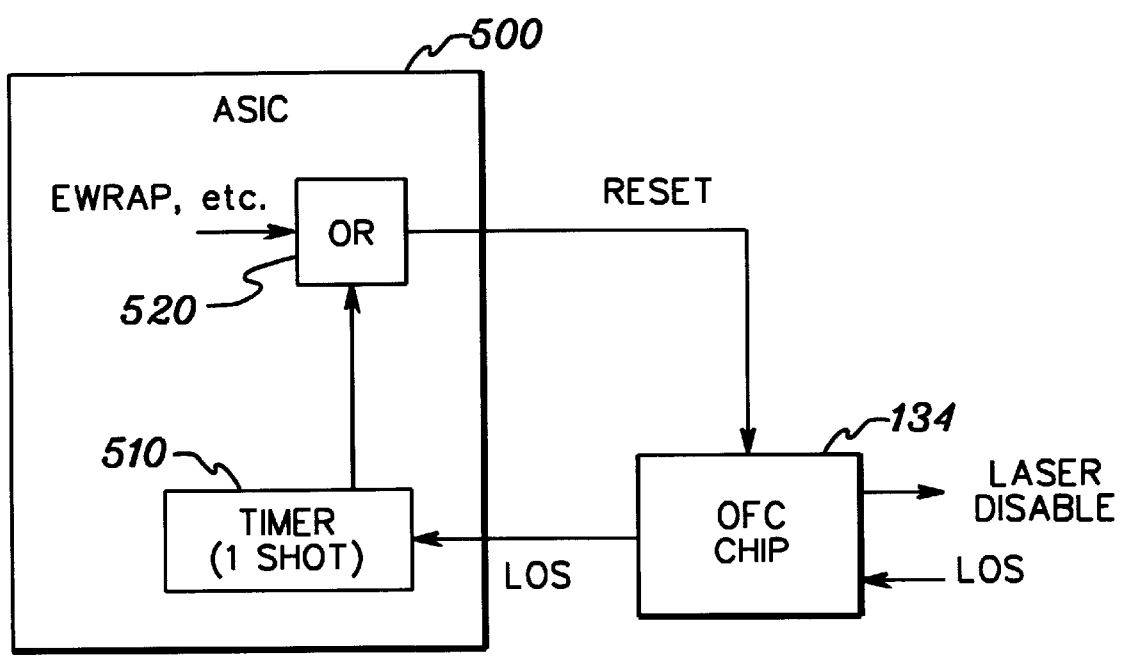
FIG. 5 is a block diagram of one embodiment of an open fiber control (OFC) chip reset function in accordance with one aspect of the present invention.

FIG. 5 depicts one example of circuitry to implement the automatic reset function. An OFC chip 134 receives as input a loss of signal (LOS) indication from the optical channel and propagates the LOS indicator to a one-shot timer 510 within ASIC 500. OFC protocols are designed to pulse the laser every so often (e.g., about once every 10 seconds), so the timer is set for an interval longer this (e.g., 30 seconds). Therefore, if the link goes down and then comes back in 10 seconds as it should, the OFC chip is working properly. If the timer expires before the link re-initializes, then an assumption is made that the OFC chip needs to be reset. The ASIC timer fires a 1-shot pulse when it expires, which in turn triggers the OFC chip reset line. Specifically, timer 110 feeds an OR circuit 520 which sends a reset signal back to the OFC chip 210. In practice, it may be desirable to reset the OFC chip for other conditions as well, such as electrical wrap diagnostics. These signals are each input to OR circuit 520. Thus, the system automatically tries to reset the OFC chip whenever there is a possibility that reset is required. The system no longer has to wonder whether the link is waiting for a reset signal from some outside source because a reset is provided periodically when it may be needed.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for automatically initializing a fiber optic data link in one of a plurality of modes, said method comprising:

automatically bringing up the fiber optic data link in one mode of a plurality of fiber control modes;

determining whether the fiber optic data link initializes in said one mode; and automatically disabling the one mode if the fiber optic data link does not initialize and determining thereafter whether the fiber optic data link initializes in another mode of the plurality of fiber control modes.

2. The method of claim 1, wherein the plurality of fiber control modes comprises at least one open fiber control (OFC) mode.

3. The method of claim 2, wherein the plurality of fiber control modes further comprises a non-OFC mode.

4. The method of claim 3, wherein said automatically bringing up comprises automatically bringing up the fiber optic data link in one OFC mode of said at least one OFC mode, and wherein said automatically disabling comprises automatically disabling said one OFC mode if the fiber optic data link does not initialize therein and determining thereafter whether the fiber optic data link initializes in said non-OFC mode of the plurality of fiber control modes.

5. The method of claim 4, further comprising waiting n×(pulse repetition time (PRT)), wherein n>1, after bringing up the fiber optic data link in said one OFC mode before determining whether the fiber optic data link initializes therein.

6. The method of claim 5, further comprising waiting n×PRT after said disabling of the one OFC mode before determining whether the fiber optic data link initializes in the non-OFC mode.

7. The method of claim 4, wherein the at least one OFC mode comprises a plurality of OFC modes and the one OFC mode comprises a first OFC mode of the plurality of OFC modes, and said method further comprises automatically bringing up the fiber optic data link in another OFC mode of said plurality of OFC modes if the fiber optic data link does not initialize in the first OFC mode.

8. The method of claim 7, further comprising repeating said bringing up of the fiber optic data link in each OFC mode of said plurality of OFC modes until said fiber optic data link initializes in one OFC mode of said plurality of OFC modes or until said fiber optic data link initializes in said non-OFC mode.

9. The method of claim 1, wherein said fiber optic data link comprises a first transceiver and a second transceiver and wherein said method further comprises implementing said automatically bringing up, said determining and said automatically disabling in auto-detect logic associated with at least one of said first transceiver and said second transceiver.

10. The method of claim 9, wherein said method further comprises providing safety logic with said auto-detect logic to ensure disabling of the fiber optic data link if the fiber optic data link is initialized in an open fiber control (OFC) mode and said OFC mode is subsequently disabled.

11. The method of claim 1, further comprising providing a manual override of said automatically bringing up which allows a user of the fiber optic data link to specify whether the fiber optic data link is to initialize in a fiber control mode comprising one of an open fiber control (OFC) mode or a non-OFC mode.

12. The method of claim 1, wherein the plurality of fiber control modes includes at least one open fiber control (OFC) mode provided by an OFC chip associated with the fiber optic data link, and wherein said method further comprises automatically resetting the OFC chip responsive to a loss of signal being received across a channel of the fiber optic data link.

13. The method of claim 12, wherein said automatically resetting includes waiting a predefined time interval subsequent to receipt of the loss of signal before initiating automatic resetting of the OFC chip.

14. A method for initializing a fiber optic data link in one of a plurality of modes, said method comprising:

providing a plurality of fiber control modes within which the fiber optic data link can be initialized, wherein the plurality of fiber control modes includes at least one open fiber control (OFC) mode;

selecting one mode of the plurality of fiber control modes in which to bring up and initialize the fiber optic data link; and providing hardware safety logic associated with the fiber optic data link to ensure disabling of the fiber optic data link if the data link is initialized in an OFC mode and said OFC mode is subsequently disabled.

15. The method of claim 14, wherein said selecting comprises user selecting said one mode in which to bring up and initialize the fiber optic data link.

16. The method of claim 14, wherein said selecting comprises automatically selecting said one mode in which to bring up and initialize the fiber optic data link.

17. A system for automatically initializing a fiber optic data link in one of a plurality of modes, said system comprising:

means for automatically bringing up the fiber optic data link in one mode of a plurality of fiber control modes;

means for determining whether the fiber optic data link initializes in said one mode; and means for automatically disabling the one mode if the fiber optic data link does not initialize and for determining thereafter whether the fiber optic data link initializes in another mode of the plurality of fiber control modes.

18. The system of claim 17, wherein the plurality of fiber control modes comprises at least one open fiber control (OFC) mode.

19. The system of claim 18, wherein the plurality of fiber control modes further comprises a non-OFC mode.

20. The system of claim 19, wherein said means for automatically bringing up comprises means for automatically bringing up the fiber optic data link in one OFC mode of said at least one OFC mode, and wherein said means for automatically disabling comprises means for automatically disabling said one OFC mode if the fiber optic data link does not initialize therein and means for determining thereafter whether the fiber optic data link initializes in said non-OFC mode of the plurality of fiber control modes.

21. The system of claim 20, further comprising means for waiting n×(pulse repetition time (PRT)), wherein n>1, after bringing up the fiber optic data link in said one OFC mode before determining whether the fiber optic data link initializes therein.

22. The system of claim 21, further comprising means for waiting n×PRT after said disabling of the one OFC mode before determining whether the fiber optic data link initializes in the non-OFC mode.

23. The system of claim 20, wherein the at least one OFC mode comprises a plurality of OFC modes and the one OFC mode comprises a first OFC mode of the plurality of OFC modes, and said system further comprises means for automatically bringing up the fiber optic data link in another OFC mode of said plurality of OFC modes if the fiber optic data link does not initialize in the first OFC mode.

24. The system of claim 23, further comprising means for repeating said bringing up of the fiber optic data link in each OFC mode of said plurality of OFC modes until said fiber optic data link initializes in one OFC mode of said plurality of OFC modes or until said fiber optic data link initializes in said non-OFC mode.

25. The system of claim 17, wherein said fiber optic data link comprises a first transceiver and a second transceiver and wherein said system further comprises implementing said means for automatically bringing up, said means for determining and said means for automatically disabling in auto-detect logic associated with at least one of said first transceiver and said second transceiver.

26. The system of claim 25, wherein said system further comprises safety logic associated with said auto-detect logic, said safety logic ensuring disabling of the fiber optic data link if the fiber optic data link is initialized in an open fiber control (OFC) mode and said OFC mode is subsequently disabled.

27. The system of claim 25, further comprising means for providing a manual override of said means for automatically bringing up which allows a user of the fiber optic data link to specify whether the fiber optic data link is to initialize in a fiber control mode comprising one of an open fiber control (OFC) mode or a non-OFC mode.

28. The system of claim 17, wherein the plurality of fiber control modes includes at least one open fiber control (OFC) mode provided by an OFC chip associated with the fiber optic data link, and wherein said system further comprises means for automatically resetting the OFC chip responsive to a loss of signal being received across a channel of the fiber optic data link.

29. The system of claim 28, wherein said means for automatically resetting includes means for waiting a predefined time interval subsequent to receipt of the loss of signal before initiating automatic resetting of the OFC chip.

30. A fiber control system for a fiber optic data link having a transceiver and an open fiber control (OFC) circuit coupled thereto, said control system comprising:

an auto detect circuit coupled to said OFC circuit and said transceiver, said auto detect circuit being adapted to automatically initialize the fiber optic data link in one mode of a plurality of fiber control modes, wherein the plurality of fiber control modes includes at least some of multiple open fiber control (OFC) modes and a non-OFC mode.

31. The control system of claim 30, further comprising a safety circuit coupled to said auto detect circuit, said safety circuit being adapted to automatically disable the fiber optic data link if the fiber optic data link is initialized by said auto detect circuit in an open fiber control (OFC) mode and said OFC mode is subsequently disabled.

32. The control system of claim 31, wherein the auto detect circuit comprises logic for cycling among said plurality of fiber control modes to determine said one mode in which to initialize the fiber optic data link.

33. A system for initializing a fiber optic data link in one of a plurality of modes, said system comprising:
means for providing a plurality of fiber control modes within which the fiber optic data link can be initialized, wherein the plurality of fiber control modes includes at least one open fiber control (OFC) mode;
means for selecting one mode of the plurality of fiber control modes in which to bring up and initialize the fiber optic data link; and
hardware safety logic associated with the fiber optic data link and adapted to ensure disabling of the fiber optic data link if the data link is initialized in an OFC mode and said OFC mode is subsequently disabled.

34. The system of claim 33, wherein said means for selecting comprises means for user selecting said one mode in which to bring up and initialize the fiber optic data link.

35. The system of claim 33, wherein said means for selecting comprises means for automatically selecting said one mode in which to bring up and initialize the fiber optic data link.

36. A system for initializing a fiber optic data link in one of a plurality of modes, said system comprising:
a select circuit adapted to provide a plurality of fiber control modes within which the fiber optic data link can be initialized, wherein the plurality of fiber control modes includes at least one open fiber control (OFC) mode;
wherein said select circuit is further adapted to select one mode of the plurality of fiber control modes in which to bring up and initialize the fiber optic data link; and
hardware safety logic associated with the fiber optic data link to ensure disabling of the fiber optic data link if the data link is initialized in an OFC mode by the select circuit and said OFC mode is subsequently disabled.

37. At least one program storage device readable by a machine, tangibly embodying at least one program of instructions executable by the machine to perform a method of automatically initializing a fiber optic data link in one mode of a plurality of modes, comprising:
automatically bringing up the fiber optic data link in one mode of a plurality of fiber control modes;
determining whether the fiber optic data link initializes in said one mode; and
automatically disabling the one mode if the fiber optic data link does not initialize and determining thereafter whether the fiber optic data link initializes in another mode of the plurality of fiber control modes.

38. The at least one program storage device of claim 37, wherein the plurality of fiber control modes comprises at least one open fiber control (OFC) mode.

39. The at least one program storage device of claim 38, wherein the plurality of fiber control modes further comprises a non-OFC mode.

40. The at least one program storage device of claim 39, wherein said automatically bringing up comprises automatically bringing up the fiber optic data link in one OFC mode of said at least one OFC mode, and wherein said automatically disabling comprises automatically disabling said one OFC mode if the fiber optic data link does not initialize therein and determining thereafter whether the fiber optic data link initializes in said non-OFC mode of the plurality of fiber control modes.

41. The at least one program storage device of claim 40, further comprising waiting n×(pulse repetition time (PRT)), wherein n>1, after bringing up the fiber optic data link in said one OFC mode before determining whether the fiber optic data link initializes therein.

42. The at least one program storage device of claim 41, further comprising waiting n×PRT after said disabling of the one OFC mode before determining whether the fiber optic data link initializes in the non-OFC mode.

43. The at least one program storage device of claim 40, wherein the at least one OFC mode comprises a plurality of OFC modes and the one OFC mode comprises a first OFC mode of the plurality of OFC modes, and said method further comprises automatically bringing up the fiber optic data link in another OFC mode of said plurality of OFC modes if the fiber optic data link does not initialize in the first OFC mode.

44. The at least one program storage device of claim 43, further comprising repeating said bringing up of the fiber optic data link in each OFC mode of said plurality of OFC modes until said fiber optic data link initializes in one OFC mode of said plurality of OFC modes or until said fiber optic data link initializes in said non-OFC mode.

45. The at least one program storage device of claim 37, wherein said fiber optic data link comprises a first transceiver and a second transceiver and wherein said method further comprises implementing said automatically bringing up, said determining and said automatically disabling in auto-detect logic associated with at least one of said first transceiver and said second transceiver.

46. The at least one program storage device of claim 45, wherein said method further comprises providing safety logic with said auto-detect logic to ensure disabling of the fiber optic data link if the fiber optic data link is initialized in an open fiber control (OFC) mode and said OFC mode is subsequently disabled.

47. The at least one program storage device of claim 37, further comprising providing a manual override of said automatically bringing up which allows a user of the fiber optic data link to specify whether the fiber optic data link is to initialize in a fiber control mode comprising one of an open fiber control (OFC) mode or a non-OFC mode.

48. The at least one program storage device of claim 37, wherein the plurality of fiber control modes includes at least one open fiber control (OFC) mode provided by an OFC chip associated with the fiber optic data link, and wherein said method further comprises automatically resetting the OFC chip responsive to a loss of signal being received across a channel of the fiber optic data link.

49. The at least one program storage device of claim 48, wherein said automatically resetting includes waiting a predefined time interval subsequent to receipt of the loss of signal before initiating automatic resetting of the OFC chip.

50. At least one program storage device readable by a machine, tangibly embodying at least one program of instructions executable by the machine to perform a method of initializing a fiber optic data link in one of a plurality of modes, comprising:

providing a plurality of fiber control modes within which the fiber optic data link can be initialized, wherein the plurality of fiber control modes includes at least one open fiber control (OFC) mode;

selecting one mode of the plurality of fiber control modes in which to bring up and initialize the fiber optic data link; and providing hardware safety logic associated with the fiber optic data link to ensure disabling of the fiber optic data link if the data link is initialized in an OFC mode and said OFC mode is subsequently disabled.

51. The at least one program storage device of claim 50, wherein said selecting comprises user selecting said one mode in which to bring up and initialize the fiber optic data link.

52. The at least one program storage device of claim 50, wherein said selecting comprises automatically selecting said one mode in which to bring up and initialize the fiber optic data link.

* * * * *